Patented May 22, 1928.

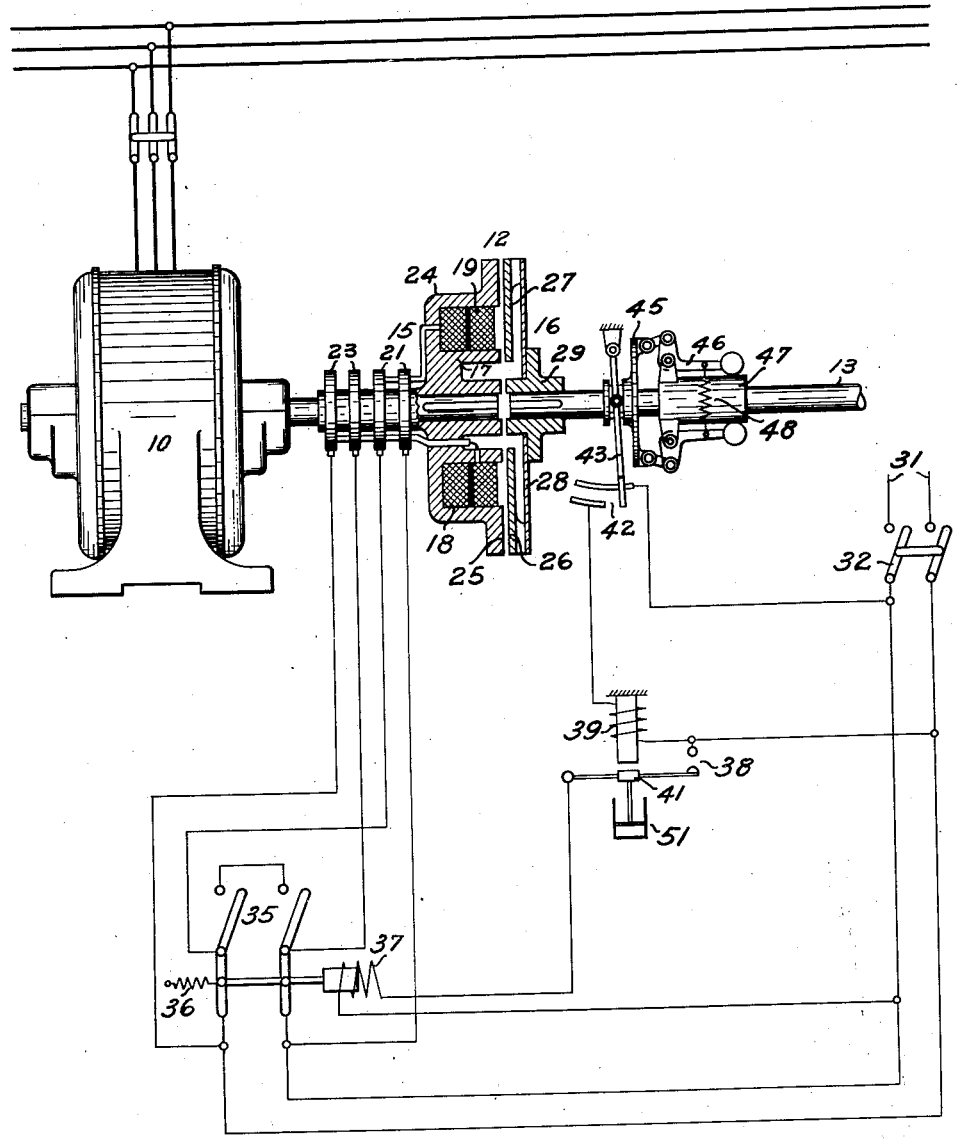

1,671,057

UNITED STATES PATENT OFFICE.

FRANK K. BRAINARD, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

ELECTROMAGNETIC CLUTCH.

Application filed March 26, 1923, Serial No. 627,636. Renewed August 10, 1926.

This invention relates in general to electromagnetic clutches, and has specific relation to the control of the energization of such clutches.

A disadvantageous feature of the operation of electromagnetic clutches of ordinary commercial design is that these clutches require considerably heavier current during certain periods, such as the starting operation of a load shaft, than is required to hold the parts of the clutch in secure clutching relation when the load shaft is up to normal operating speed. Ordinarily, the periods of normal running are considerably greater than the starting periods, and hence, especially in connection with the larger sizes of clutches, there is a considerable waste of energy in maintaining such clutches energized to the maximum extent during normal operation of the load shaft with which the clutch is associated.

The present invention contemplates a simple and economical design of electromagnetic clutch which embodies an energizing winding, preferably in the form of a plurality of sections, that may be controlled so as to provide maximum energization of the clutch for use during starting of the load with which the clutch is associated, and to provide reduced energization of the clutch of such a character as to be sufficient under normal operating conditions of the load. The preferred embodiment of the invention contemplates a form of control for the clutch which eliminates the use of resistance and other features that might result in the uneconomical utilization of electrical energy; and the preferable method of utilizing the improved type of clutch includes the use of automatic devices for effecting the desired control of the clutch energization at the times and under the conditions desired.

It is an object of this invention to provide an improved design of electromagnetic clutch embodying devices associated with the energizing winding of the clutch for permitting variation in the energization of the clutch.

It is a further object of this invention to provide an improved design of electromagnetic clutch embodying the use of an energizing winding in a plurality of sections and devices for changing the connections between said sections from parallel to series.

It is a further object of this invention to provide an improved design of electromagnetic clutch of the character described wherein the desired variation in the energization of the clutch is automatically accomplished in response to the attainment of desired operating conditions of the load with which said clutch is associated.

These and other objects and advantages are attained by this invention, various novel features of which will be apparent from the description and drawings, disclosing an embodiment of the invention, and will be more particularly pointed out in the claims.

In the drawings, there is illustrated an embodiment of this invention, parts of the clutch being shown in section, and the controlling system therefor being in diagrammatic form.

In accordance with the illustrated disclosure herein, the shaft of an electric motor 10 has associated therewith an electromagnetic clutch 12 which serves to drivingly connect a load shaft 13 for operation by the motor 10. The electromagnetic clutch comprises a member 15 fixed on the motor shaft and a co-operative member 16 fixedly mounted on the load shaft 13. The member 15 comprises a central core 17 and an energizing winding, in the form of a plurality of sections 18, 19, surrounding the central core 17. The terminals of the winding sections 18, 19, are brought out and connected to slip-rings 21, 23, respectively. The member 15 is provided with an outer annular shell 24 surrounding the energizing winding and having an annular extension at its outer edge which is provided with a polar face 25 for co-operation with a corresponding polar face 26 formed on an armature element 27 carried by one or more resilient arms 28 which are held secured at the inner side to a sleeve-like hub 29 secured to the shaft 13. The armature 27 has its radial dimensions such that when drawn to attracted position, the armature is in substantial enagement with both the polar face 25 of the shell 24 and a polar face formed upon the central core 17. When the clutch is deenergized, the resilience of the support 28 causes movement of the armature 27 away from the element 15 of the clutch so as to permit relative rotation between the alined motor and load shafts.

The energizing winding of the clutch may be supplied from the direct current supply line 31, preferably through the switch 32, and the slip-rings 21 and 23. The winding sections 18, 19, are so chosen or designed as to the ampere-turns thereof, that when these winding sections are connected in parallel, the resultant energization of the clutch is sufficient to maintain the parts thereof in secure clutching engagement under the heaviest load conditions liable to be encountered, such as during starting of the load driven by the motor; and when connected in series, the resultant energization of these winding sections is such as to maintain the parts in secure clutching engagement under any ordinary conditions liable to be encountered during normal operation of the load.

A double-pole double-throw switch 35 is biased, as by a spring 36, to a position wherein it connects the winding sections 18, 19, through the slip-rings 21, 23, respectively, to the supply line 31, with the winding sections connected in parallel to the supply line. The switch 35 is actuable by an electromagnet 37, when energized, to its other operative position wherein the winding sections 18, 19 are connected, through the slip-rings 21, 23, respectively, to the supply line 31, with the winding sections connected in series. The simplest form of means for energizing the electromagnet 37 would be a manually operated switch which would serve to complete the circuit of the energizing winding of this electromagnet, as desired.

It is preferable that the change in connections of the winding sections 18, 19 from parallel to series, and vice versa, be wholly automatic. For this purpose, the circuit of the energizing winding of the electromagnet 37 is completed through a switch 38 operable by an electromagnet 39, the movable armature 41 of the magnet being associated with the movable element of the switch 38 and serving to cause closure of the switch when the electromagnet is energized. The circuit of the energizing winding of the electromagnet 39 is closed at the switch 42, the movable element of which is preferably in the form of a pivoted arm, as indicated, this arm being so associated with a sleeve 45 mounted on the load shaft 13 as to cause actuation of the switch arm to closed and open positions as the sleeve is reciprocated on the shaft. The sleeve 45 is moved to a position wherein it causes closure of the switch 42, in response to the effect of centrifugal force on the weighted levers 46 pivoted to a sleeve or hub 47 secured to the shaft 13. As indicated, these weighted levers 46 are biased by a spring 48 to positions adjacent the shaft. When the speed of the latter rises to a predetermined value, the weighted levers have reached a position wherein they cause shifting of the sleeve 45 along the shaft, the connection between the short arm of each lever 46 and a co-operative portion of the sleeve 45 being of such a loose nature as to permit the desired movement of the parts.

A retarding device 51 is preferably associated with the movable element of the switch 38 to insure its closure only after a predetermined time-interval subsequent to the energization of the electromagnet 39.

Assuming the parts of the combination in the condition indicated in the drawings and the motor 10 at rest, and it is desired to place the shaft 13 and its load in operation. The supply circuit of the motor 10 is closed, either simultaneously or subsequently to the closure of the energizing circuit of the clutch, at the switch 32, the winding sections 18 and 19 of the energizing winding being connected in parallel at this time. With this connection of the winding sections, the energization of the clutch is a maximum, that is, sufficient to enable the clutch to transmit any power required during the operation of bringing the load up to normal running speed. As the speed of the shaft 13 increases, the weighted ends of the levers 46 are thrown outwardly to an extent dependent upon the actual speed of the shaft. When this speed reaches a predetermined value corresponding to normal running speed, the movable element 43 of the switch 42 has been actuated to cause closure of the energizing circuit of the electro-magnet 39, with the consequent closure of the switch 38 after a predetermined time-interval, dependent upon the setting of the retarding device 51. On closure of the switch 38 and consequent energization of the electromagnet 37, the switch 35 is actuated to change the connection of the winding sections 18, 19 from parallel to series, with the result that the current flow through the windings and the energization of the clutch are reduced to the desired extent, depending upon the energization required to maintain the clutch parts in secure clutching engagement under normal running conditions. This connection of the winding sections is maintained while the speed of the load shaft remains around the predetermined normal value.

It will be apparent that the invention claimed is not limited to the exact details of construction shown and described, for obvious modifications will be apparent to one skilled in the art.

It is claimed and desired to secure by Letters Patent:

1. In an electromagnetic clutch, a pair of co-operative clutch members, an energizing winding for said clutch comprising a plurality of winding sections, and means for varying the connections of said winding sections to provide a plurality of conditions of positive energization of said clutch with each of said winding sections in circuit under the several conditions of clutch energization.

2. In an electromagnetic clutch, a pair of co-operative clutch members, an energizing winding for said clutch comprising a plurality of winding sections, and means for varying the connections of said winding sections while maintaining flow therethrough in the same direction to provide a plurality of conditions of positive energization of said clutch with each of said winding sections in circuit under the several conditions of clutch energization.

3. In an electromagnetic clutch, a pair of co-operative clutch members, an energizing winding for said clutch comprising a plurality of winding sections, and means for interchangeably connecting said winding sections in parallel and series relation to vary the energization of said clutch.

4. In an electromagnetic clutch, a pair of co-operative clutch members adapted to act as driving and driven members, an energizing winding for said clutch comprising a plurality of winding sections, and means responsive to the attainment of a predetermined operating speed of the driven element of said clutch for varying the connections of said winding sections to vary the energization of said clutch.

5. In an electromagnetic clutch, a pair of co-operative clutch members adapted to act as driving and driven members, an energizing winding for said clutch comprising a plurality of winding sections, and means responsive to the speed of the driven element of said clutch for varying the connections of said winding sections while maintaining flow therethrough in the same direction to vary the energization of said clutch.

6. In an electromagnetic clutch, a pair of co-operative clutch members adapted to act as driving and driven members, an energizing winding for said clutch comprising a plurality of winding sections, and means responsive to the speed of the driven element of said clutch for changing the connections of said winding sections from parallel to series relation to reduce the energization of said clutch.

7. In an electromagnetic clutch, a pair of co-operative clutch members adapted to act as driving and driven members, an energizing winding for said clutch, and automatically operative means responsive to the speed of said driven member for reducing the energization of said clutch a predetermined time after said driven member has attained a predetermined operating speed.

8. In an electromagnetic clutch, a pair of co-operative clutch members adapted to act as driving and driven members, an energizing winding for said clutch comprising a plurality of winding sections normally connected in parallel, and means responsive to and operable a predetermined time after the attainment of a predetermined operating speed of the driven member for changing the connections of said winding sections from parallel to series.

9. In an electromagnetic clutch, a pair of cooperative driving and driven clutch members, an energizing winding for said clutch comprising a plurality of winding sections, and means responsive to a predetermined condition attendant upon the operation of said clutch for varying the connections of said winding sections to vary the energization of said clutch with each of said winding sections in circuit under the several conditions of clutch energization.

10. In an electromagnetic clutch, a pair of cooperative clutch members associated with driving and driven elements, an energizing winding for said clutch, and means responsive to an increase in the speed of operation of one of said elements to a predetermined value for reducing the energization of said clutch to a positive value which insures normal operation of said driven element by said driving element independently of variations from normal value in the load thereon and with the circuit through said energizing winding established continuously during such reduced energization.

11. In combination, driving and driven elements, an electromagnetic clutch having cooperative clutch members associated with said driving and driven elements, and an energizing winding for said clutch comprising a plurality of winding sections, and means responsive to the occurrence of a predetermined condition attendant upon the operation of one of said elements for varying the connections of said winding sections to cause reduction in the energization of said clutch while utilizing both of said winding sections as positive sources of energization.

12. In combination, driving and driven elements, an electromagnetic clutch having cooperative clutch members associated with said driving and driven elements, and an energizing winding for said clutch, and means responsive to the occurrence of a predetermined condition attendant upon the operation of one of said elements for reducing the energization of said clutch to a predetermined definite value independent of fluctuation in the load on the driven member without continued interruption of the circuit of said energizing winding.

13. In combination, driving and driven elements, an electromagnetic clutch having cooperative clutch members associated with said driving and driven elements, and an energizing winding for said clutch, and means for controlling the energization of said clutch due to said winding, said means being operative to insure a predetermined degree of energization of said clutch during the bringing of said driven element up to normal operating speed and automatically operative in response to a characteristic of the operation of said driven member for insuring operation of the latter by said driving member at said normal operating speed through said clutch with the energization thereof reduced and without continued interruption of the circuit of said energizing winding.

14. In combination, driving and driven elements, an electromagnetic clutch having cooperative clutch members associated with said driving and driven elements, and an energizing winding for said clutch comprising a plurality of winding sections, and means responsive to the attainment by one of said members of normal operating condition for reducing the energization of the clutch without interrupting the operation of said driven member by said driving member through said clutch and while utilizing both of said winding sections as positive sources of energization.

15. In combination, driving and driven elements, an electromagnetic clutch having cooperative clutch members associated with said driving and driven elements, and an energizing winding for said clutch comprising a plurality of winding sections, and means for controlling the energization of said clutch, said means insuring a predetermined degree of energization of said clutch through said winding sections during the bringing of said driven member up to normal operating speed, and including devices automatically operative in response to a characteristic of the operation of one of said elements to insure variation of the connections of said winding sections to cause reduction in the energization of said clutch while utilizing both of said winding sections as positive sources of energization.

16. In combination, driving and driven elements, an electromagnetic clutch having cooperative clutch members associated with said driving and driven elements, and an energizing winding for said clutch comprising a plurality of winding sections, and means for controlling the energization of said clutch through said winding, said means being operative to insure a predetermined degree of energization of said clutch during the bringing of said driven element up to normal operating speed and automatically operative in response to the attainment of said operating speed for insuring operation of said driven member at said normal operating speed through said clutch with the latter energized to a reduced degree while utilizing a plurality of said winding sections as positive sources of energization.

In testimony whereof, the signature of the inventor is affixed hereto.

FRANK K. BRAINARD.